United States Patent
Soh et al.

[11] Patent Number: 5,973,434
[45] Date of Patent: Oct. 26, 1999

[54] ARMATURE FOR ROTARY ELECTRIC MACHINE HAVING WELDED JOINT BETWEEN UPPER AND LOWER COIL CONDUCTORS

[75] Inventors: Masahiro Soh; Masanori Ohmi, both of Anjo; Hideki Ichikawa, Inazawa, all of Japan

[73] Assignee: Denso Corporation, Kariya, Japan

[21] Appl. No.: 09/037,827

[22] Filed: Mar. 11, 1998

[30] Foreign Application Priority Data

| Apr. 25, 1997 | [JP] | Japan | 9-108652 |
| Jul. 24, 1997 | [JP] | Japan | 9-198073 |
| Jan. 14, 1998 | [JP] | Japan | 10-005715 |

[51] Int. Cl.[6] ................................. H02K 1/22
[52] U.S. Cl. .................. 310/261; 310/264; 310/265
[58] Field of Search ............................ 310/201, 264, 310/265, 261, 195, 216

[56] References Cited

U.S. PATENT DOCUMENTS

| 1,775,633 | 9/1930 | Apple | 310/201 |
| 1,853,161 | 4/1932 | Apple | 310/201 |
| 3,634,708 | 1/1972 | Fisher | 310/195 |
| 5,508,577 | 4/1996 | Shiga et al. | 310/201 |
| 5,625,242 | 4/1997 | Shiga et al. | 310/201 |
| 5,650,683 | 7/1997 | Shiga et al. | 310/201 |
| 5,739,617 | 4/1998 | Katoh et al. | 310/214 |

FOREIGN PATENT DOCUMENTS

| 7-231618 | 8/1995 | Japan . |
| 92/06527 | 4/1990 | WIPO ............. H02K 3/12 |

*Primary Examiner*—Nestor Ramirez
*Assistant Examiner*—Joseph Waks
*Attorney, Agent, or Firm*—Pillsbury Madison & Sutro LLP

[57] ABSTRACT

An armature coil is formed by welding upper and lower coil conductors each having a coil trunk, a pair of coil arms and a pair of coil extensions. Between an upper coil extension and a lower coil extension to be welded together, a recess is formed. This recess may be formed at the corner between a side face of an upper coil arm which is at the side of the armature core and a radially inner side face of the upper coil extension. The radially inner side face of the upper coil extension has a space against the radially outer side face of the lower coil extension only at the location where the recess is provided, while the radially inner side face except for the recess contacts the radially outer side face of the lower coil extension.

10 Claims, 8 Drawing Sheets

ARMATURE FOR ROTARY ELECTRIC MACHINE HAVING WELDED JOINT BETWEEN UPPER AND LOWER COIL CONDUCTORS

CROSS REFERENCE TO RELATED APPLICATION

This application relates to and incorporates herein by reference Japanese Patent Applications No. 9-108652, No. 9-198073 and No. 10-5715 filed on Apr. 25, 1997, Jul. 24, 1997 and Jan. 14, 1998, respectively.

BACKGROUND OF THE INVENTION

The present invention relates to an armature of a rotary electric machine using U-shaped upper and lower coil conductors joined for forming an armature coil and, more particularly, to an armature of a rotary electric machine in which joined parts of upper and lower coil conductors are assuredly protected from centrifugal force and insulated from circumferentially adjacent joined parts.

Figure 15:
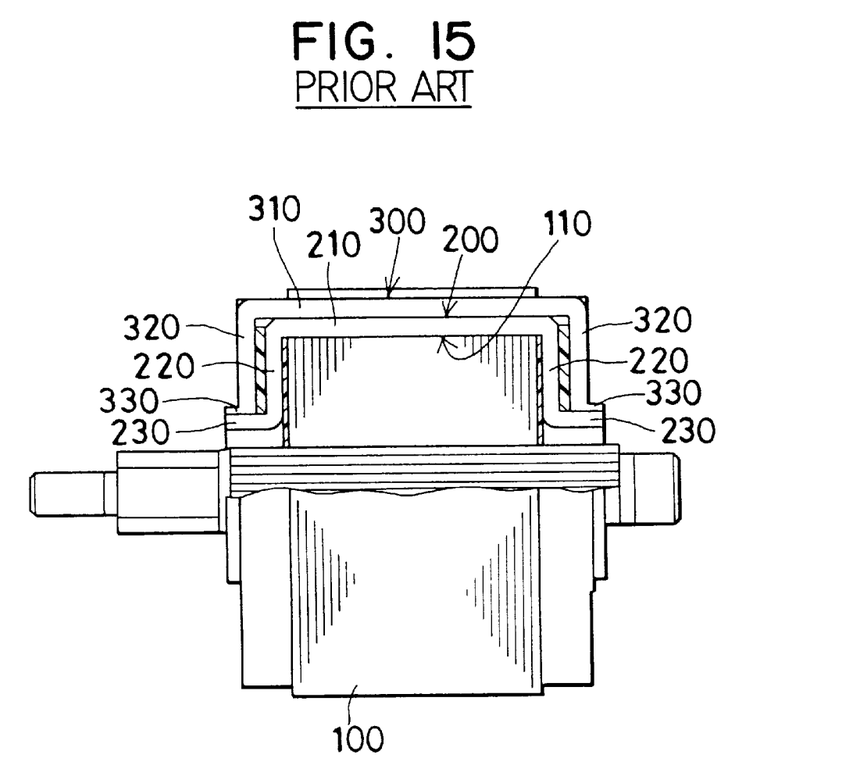
FIG. 15 is a half cross sectional view of a conventional armature.

An armature for a commutator-type rotary electric machine is known as disclosed in JP-A 7-231618. This armature includes, as shown in FIG. 15, lower coil conductors 200 and upper coil conductors 300 assembled to an armature core 100.

The coil conductors 200 and 300 comprise, respectively, coil trunks 210 and 310 accommodated in slots 110 of the armature core 100, coil arms 220 and 320 formed to extend from both axial ends of the coil trunks 210 and 310 radially inwardly toward a shaft in parallel with the axial side end faces of the armature core 100, and coil extensions 230 and 330 formed to extend from the radially innermost peripheral ends of the coil arms 220 and 320 toward the axially outer side. The tip ends of the coil extensions 230 and 330 aligned radially are electrically joined by welding or the like to provide an armature coil. As this armature uses one coil arm 320 of the upper coil conductor 300 as a commutator segment, a commutator need not be provided separately and resistance of the armature coil against centrifugal force can be enhanced. Thus, the armature can be used in high speed rotation environment. As the speed reduction ratio can be set larger in case of a starter having a speed reduction mechanism for an automotive vehicle, the armature contributes to the reduction of the starter in size.

Figure 16:
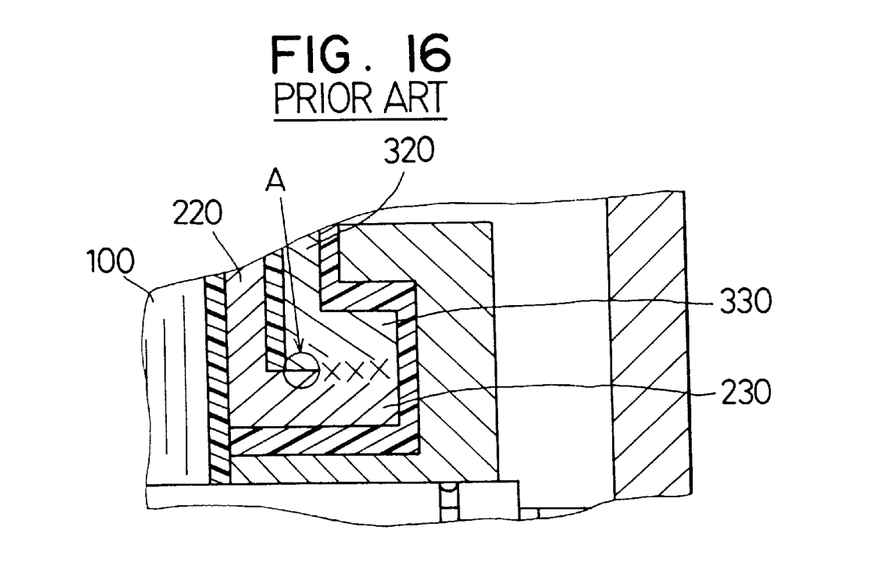
FIG. 16 is an enlarged cross sectional view showing a joined part of coil conductors in the conventional armature.

In each of the coil conductors 200 and 300 used in the above armature, however, the volume (heat capacity) of the coil arms 220 and 320 is larger than the volume (heat capacity) of the coil extensions 230 and 330. Therefore, when the tip ends of the coil extensions 230 and 330 are joined by welding, the welding heat dissipates from the coil extensions 230 and 330 to the coil arms 220 and 320. This results in, as shown in FIG. 16, imperfect joint part A at a joint between the radially outer face of the lower coil extension 230 and the radially inner face of the outer coil extension 330. This imperfect joint part A means, from the standpoint of fracture mechanics, that a crack exists initially at a boundary with the joined part. Therefore, it is likely to occur that the crack progressively extends from the imperfect joint part A to cause a crack in the joined part (i.e., from left to right in FIG. 16) as well due to the centrifugal force, when the armature rotates at a high speed.

Figure 17:
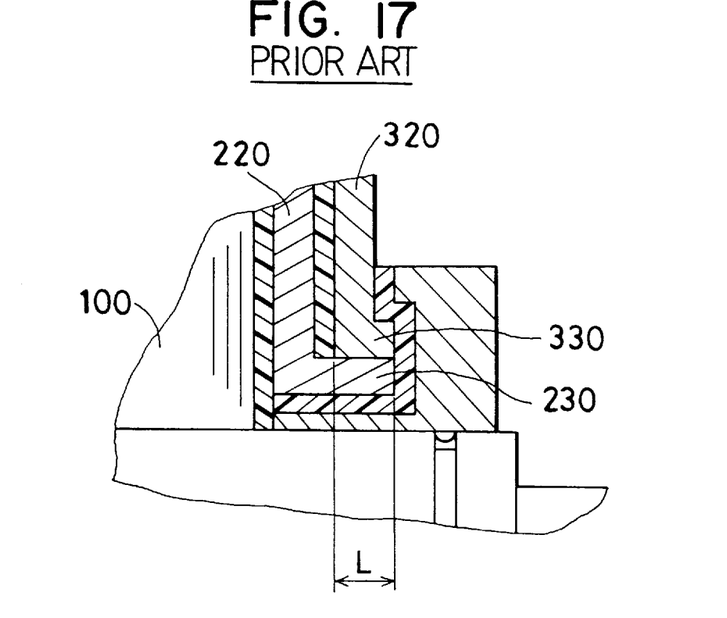
FIG. 17 is an enlarged cross sectional view showing parts of the coil conductors to be joined in the conventional armature.
Figure 18:
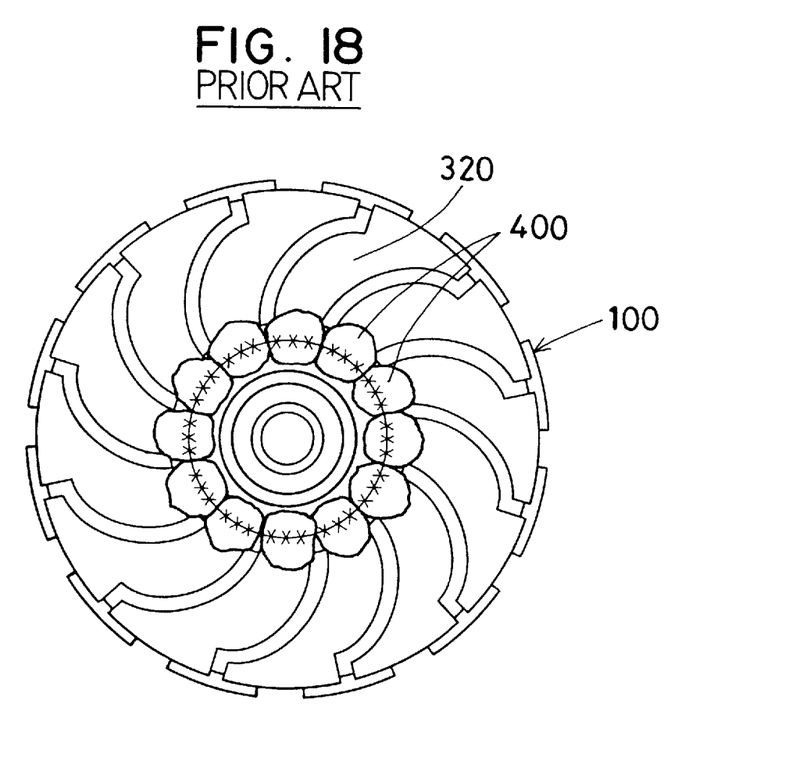
FIG. 18 is a side view showing the joined part of the coil conductors in the conventional armature.

For obviating the imperfect joint part A, the welding heat may be applied until the coil extensions 230 and 330 melt sufficiently or the axial length L of the coil extensions 230 and 330 may be shortened as shown in FIG. 17. However, the coil extensions 230 and 330 will melt excessively causing the conductor material melted by the welding heat to extend in the circumferential direction. As a result, as shown in FIG. 18, joined parts 400 which are located circumferentially adjacently will come into contact with each other disabling assured electrical insulation therebetween.

SUMMARY OF THE INVENTION

It is an object of the present invention to provide an armature of a rotary electric machine which has a high resistance against centrifugal force.

It is another object of the present invention to provide an armature of a rotary electric machine which has a good electrical insulation between adjacent welded joints of upper and lower coil conductors.

According to the present invention, at least one of radially outer side face of a lower coil extension and radially inner side face of an upper coil extension radially facing each other has a recess at a position which is axially inside of an axial end face thereof. Thus, the axial length of the radially outer side face of the lower coil extension and the radially inner side face of the upper coil extension radially contacting each other (i.e., the axial length of the contact faces to be joined) can be shortened thus eliminating imperfect joint. Further, an excess welded volume produced by heating and melting at the time of welding is enabled to flow into a space provided by the recess, the excess volume does not flow out in the circumferential direction of the joined part thus assuring electric insulation between the joined parts adjacent to each other in the circumferential direction.

Preferably, the recess is provided axially outside of the axially inner side face of the upper coil arm. More preferably, the recess is provided at the position which is radially inner side face of the upper coil extension and extends across an axial position of an axially outer side face of the upper coil arm. Thus, as a heat transfer area between the upper layer coil extension and the upper coil arm can be reduced, the heat is less likely to be transferred from the upper coil extension to the upper coil arm. As a result, the upper coil extension and the lower coil extension can be joined more assuredly.

Further, the recess is formed by the steps of providing a protrusion on one of an upper die and a lower die used for forming the upper coil extension, and relatively moving the upper die and the lower die having the protrusion thereby to form the recess concurrently with forming the upper coil extension. As the recess can be formed concurrently with the upper coil extension, the size and position of the recess relative to the upper coil extension can be stabilized with the least variations. As a result, production condition for the welding is stabilized and a good joined part can be provided. Further, productivity can be improved by the concurrent formation of the recess with the upper coil extension.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENTS

An armature of a rotary electric machine according to the present invention is described with reference to various embodiments through which the same or like parts are denoted by the same reference numerals.

(First Embodiment)

Figure 1:
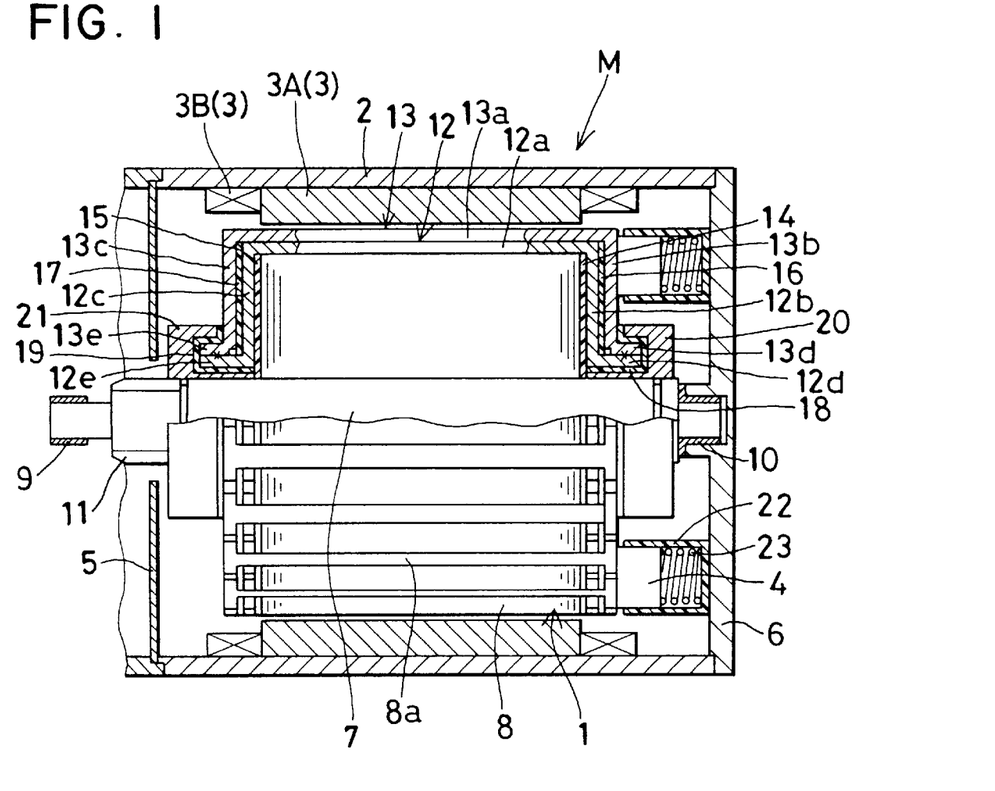
FIG. 1 is a half cross sectional view of an armature according to a first embodiment of the present invention.

An armature 1 according to this embodiment is used, for example, in a starter motor M of a starter for an automotive vehicle. The starter motor 1 includes, as shown in FIG. 1, a yoke 2 forming a magnetic frame, a fixed magnetic pole 3 attached to the inner peripheral face of the yoke 2, the armature 1 disposed at the inner periphery of the fixed magnetic pole 3, brushes 4 for supplying electric current to the armature 1, and the like. The yoke 2 is shaped cylindrically by a magnetic material such as a steel plate. Its front end opening is covered by a partition wall 5, while its rear end opening is closed by an end frame 6. The fixed magnetic pole 3 includes a plurality of magnetic pole cores 3A fixed to the inner peripheral face of the yoke 2 and field coils 3B wound on the magnetic pole cores 3A.

The armature 1 is constructed by a rotary shaft 7, an armature core 8, an armature coil (described below) and the like. The rotary shaft 7 has one end extending forwardly from the partition wall 5 and supported rotatably by a bearing 9 fixed to a starter constituting member of the starter (not shown), and the other end supported rotatably by a bearing 10 fixed to the central part of the end frame 6. A gear 11 is formed on the outer periphery at the side of the one end of the rotary shaft 7 supported by the bearing 9. The gear 11 engages a reduction gear (not shown) of a speed reduction device (for instance, planetary gear speed reduction device) to transmit rotation of the rotary shaft 7 to the reduction gear.

The armature core 8 is constructed by a plurality of stacked thin disk-like steel plates fixedly fitted around the outer periphery of the rotary shaft 7. On the outer periphery of the armature core 8, a number of (for instance, 25) slots 8a are formed to extend in the axial direction and aligned with a uniform spacing in the circumferential direction of the armature core 8.

The armature coil includes lower coil conductors 12 and upper coil conductors 13 which are the same in number as the slots 8a. Each of lower coil conductors 12 and upper coil conductors 13 is made of a material having a low electric resistance such as pure copper or pure aluminum., and is formed in the following fixed shape.

The lower coil conductor 12 comprises a lower coil trunk 12a, a pair of lower coil arms 12b and 12c, and a pair of lower coil extensions 12d and 12e. The lower coil conductor 12 is shaped in the U-character.

The lower coil trunk 12a is set to extend axially straightly and be longer than the slot 8a (axial length of the armature core 8), and is accommodated within the slot 8a through an electric insulator not shown.

The pair of lower coil arms 12b and 12c extends from both sides of the lower coil trunk 12a toward radially inner side generally in parallel with the axial side end faces of the armature core 8. It is to be noted that one lower coil arm 12b and the other lower coil arm 12c are inclined by a predetermined angle in the circumferentially opposite directions from a line (diameter) connecting the lower coil trunk 12a and the rotary shaft 7 on the plane perpendicular to the rotary shaft 7. Annular insulator plates 14 and 15 are disposed between the lower coil arms 12b and 12c and the axial end faces of the armature core 8, respectively, to provide electric insulation.

The pair of lower coil extensions 12d and 12e extend a predetermined length from the innermost peripheral ends of the lower coil arms 12b and 12c to the axially outer side (opposite side to the armature core 8), respectively.

The upper coil conductor 13 comprises an upper coil trunk 13a, a pair of upper coil arms 13b and 13c, and a pair of upper coil extensions 13d and 13e. The upper layer conductor 13 is shaped in the U-character.

The upper coil trunk 13a is set to extend axially straightly and be longer than the lower coil trunk 12a, and is accommodated at the radially outer side of the lower coil trunk 12a within the slot 8a through an electric insulator not shown.

The pair of the upper coil arms 13b and 13c extend from both ends of the upper coil trunk 13a toward the inner peripheral side along the axially outer sides of the lower coil arms 12b and 12c in generally parallel with the axial end faces of the armature core 8. It is to be noted here that the one upper coil arm 13b and the other upper coil arm 13c are inclined by a predetermined angle in the circumferentially opposite directions from a line (diameter) connecting the upper coil trunk 13a and the rotary shaft 7 on the plane perpendicular to the rotary shaft 7. The upper coil arm 13b is formed to have an axially outer side face (right side face in FIG. 1) to be used as a brush sliding face (commutator face). Annular insulator plates 16 and 17 are disposed between the lower coil arm 12b and the upper coil arm 13 and between the lower coil arm 12c and the upper coil arm 13c, respectively, to provide electric insulation therebetween.

Figure 2:
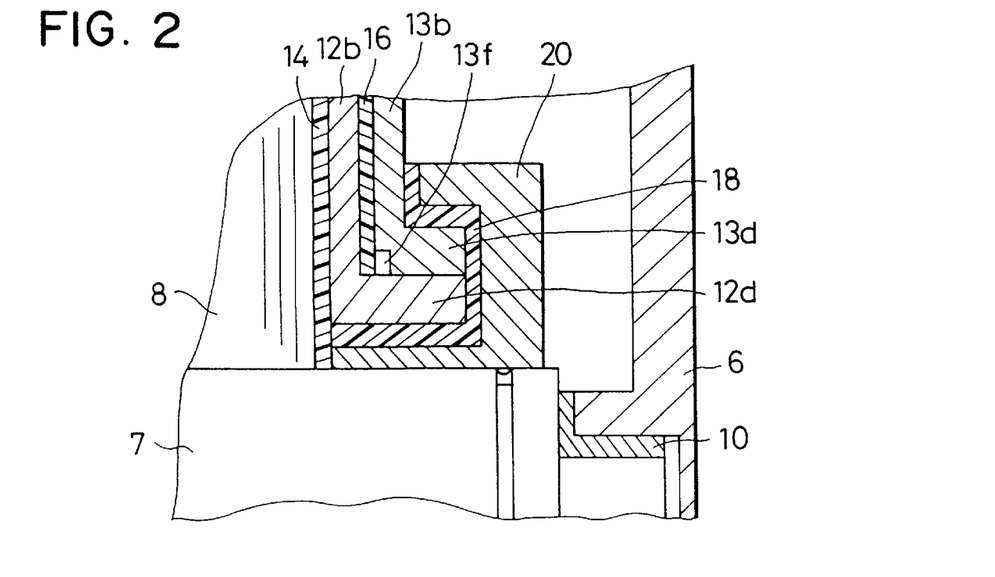
FIG. 2 is an enlarged cross sectional view showing parts of a lower coil conductor and an upper coil conductor to be joined in the first embodiment.

The pair of upper coil extensions 13d and 13e extend a predetermined length from the innermost peripheral ends of the upper coil arms 13b and 13c to the axially outer side (opposite side to the armature core 8) along the radially outer side faces of the lower coil extensions 12d and 12e, respectively. The upper coil extensions 13d and 13e are formed, as shown in FIG. 2, with recesses 13f respectively at the positions (for instance, at the corners between the axially inner side faces of the upper coil arms 13b and 13c and the radially inner side faces of the upper coil extensions 13d and 13e) which are on the radially inner side faces facing the radially outer side faces of the lower coil arms 12d and 12e and which are on the axially inner side faces. Though only one recess 13f formed on the radially inner side face of the upper coil extension 13d is shown in FIG. 2, the similar recess 13f is formed also on the radially inner side face of the upper coil extension 13e. Thus, the radially inner side faces of the upper coil extensions 13d and 13e are spaced away from the radially outer side faces of the lower coil extensions 12d and 12e only at the recesses 13f but are held in contact with the radially outer side faces of the lower coil extensions 12d and 12e except for the recessed part.

Figure 3:
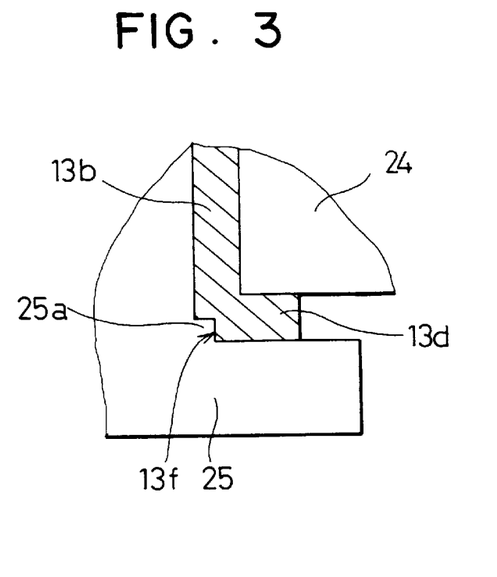
FIG. 3 is a cross sectional view showing a process for forming a recess on the upper coil extension in the first embodiment.

The recess 13f may be formed as shown in FIG. 3 by an upper die 24 and a lower die 25 which are used to form the upper coil extension 13d. The lower die 25 for forming the radially inner side face of the upper coil extension 13d is formed with a protrusion 25a for forming the recess 13f so that the recess 13f may be formed concurrently with the upper coil extension 13d by the upper die 24 and the lower die 25. More specifically, a blank (unprocessed material) for the upper coil conductor 13 is placed first between the upper die 24 and the lower die 25 and then pressed and compressed by moving up and down the upper die 24 and the lower die 25 relatively. As the protrusion 25a is formed at a predetermined position (angled corner) on the lower die 25, the recess 13f is also formed at generally the final stage of the pressing and compressing process. The recess 13f is formed also on the upper coil extension 13e.

Figure 4:
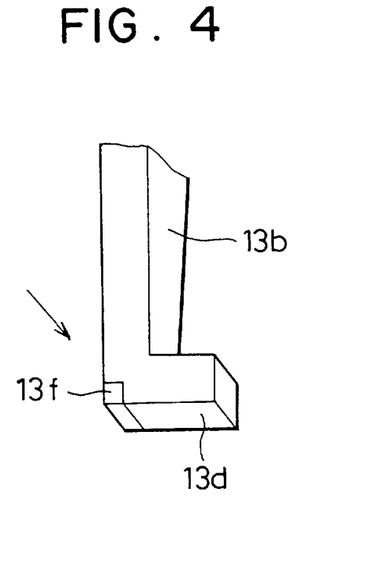
FIG. 4 is a perspective view of the upper coil extension formed in the first embodiment.

Alternatively, the recesses 13f may be formed after forming the upper coil extensions 13d and 13e by removal process such as cutting or by a shear-die-cutting process of a pressing machine in the arrow direction as shown in FIG. 4.

Figure 5:
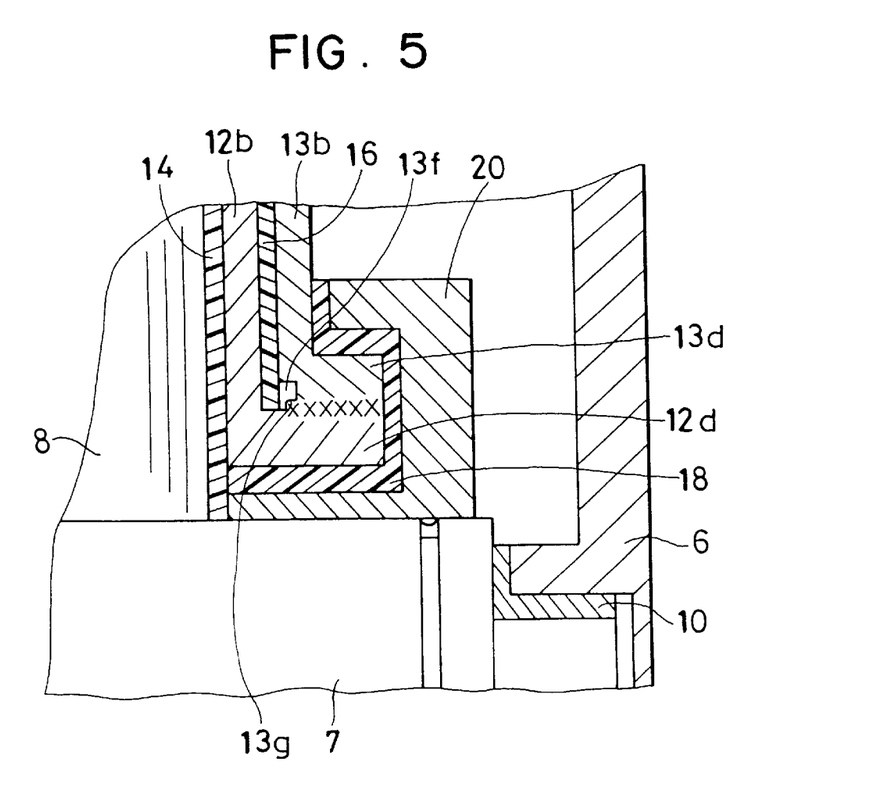
FIG. 5 is an enlarged cross sectional view showing a joined part between the lower coil conductor and the upper coil conductor in the first embodiment.

The lower coil conductor 12 in one slot 8a and the upper coil conductor 13 in another slot 8a assembled to the armature core 8 are joined together to form a part of an armature coil by welding the lower coil extensions 12d and 12e and the upper coil extensions 13d and 13e which are radially overlaid at both axial ends of the armature core 8 (FIG. 5). All the lower coil conductors 12 and the upper coil conductors 13 are thus connected electrically in succession to provide the armature coil.

After joining the lower coil extensions 12d and 12e with the upper coil extensions 13d and 13e fixedly by welding, caps 20 and 21 are fitted to both joined parts through insulators 18 and 19, respectively (FIG. 1).

Each brush 4 is supported axially slidably by a brush holder 22 fixed to the end frame at the axially rear side of the upper coil arm 13b which forms the commutator face. The brush 4 is biased by a spring 23 held in the brush holder 22 and pressed to the outer side face (commutator face) of the upper coil arm 13b.

As described above with reference to the first embodiment, the recess 13f is formed on the radially inner side faces of the upper coil extensions 13d and 13e in this embodiment, the axial length of contact between the radially inner side faces which contact the radially outer side faces of the lower coil extensions 12d and 12e is shortened, i.e., the axial length of the joined faces is shortened. Thus, when the upper coil extensions 13d and 13e and lower coil extensions 12d and 12e are welded to each other, the imperfect joint which is caused in the prior art will not occur and the entire faces to be joined will be joined as desired as shown in FIG. 5. Further, as the excess volume 13g produced by heating and melting at the time of welding is allowed to flow into the space provided by the recess 13f, it does not flow out in the circumferential direction of the joined part thus assuring electric insulation between the joined parts adjacent to each other in the circumferential direction. Thus, as the part to be joined can be joined fixedly to have sufficient mechanical strength, the armature can have high resistance against the centrifugal force at the armature coil ends (including joint parts) in a very compact size when used in a starter for starting an internal combustion engine which generates a large amount of heat in a short period of time, particularly when used in a motor of a reduction-type starter having a speed reduction mechanism for high speed rotation in compact size.

Further, as the protrusion 25a is provided on the lower die 25 for forming the upper coil extensions 13d and 13e by the upper die 24 and the lower die 25 according to the embodiment, the recess 13f can be formed concurrently with the upper coil extensions 13d and 13e. As variations in size and position of the recess 13f can be reduced to a minimum relative to the upper coil extensions 13d and 13e, processing condition at the time of welding is stabilized to provide the joint part as desired. Further, production efficiency can be enhanced by the simultaneous formation of the recess 13f and the upper coil extensions 13d and 13e.

(Second Embodiment)

Figure 6:
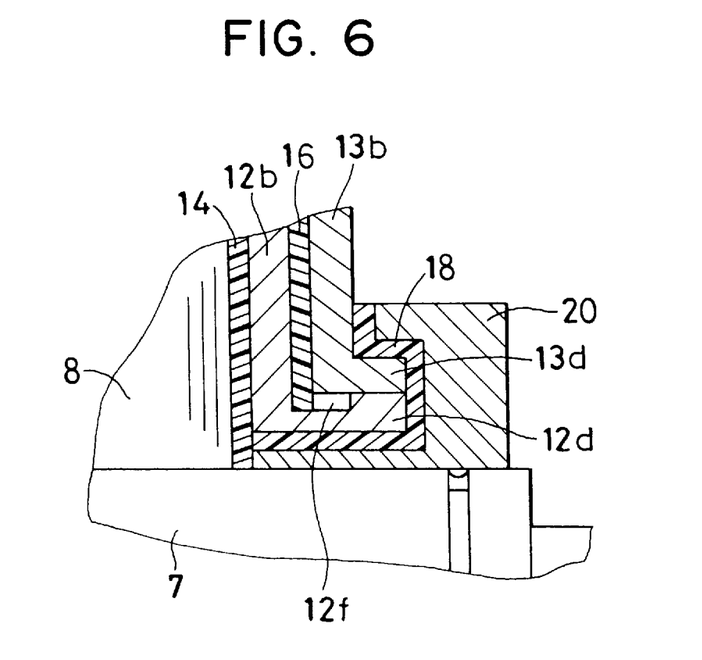
FIG. 6 is an enlarged cross sectional view showing parts of a lower coil conductor and an upper coil conductor to be joined in the second embodiment.

In this embodiment, as shown in FIG. 6, a recess 12f is formed at the axially inner sides on the radially outer side faces of the lower coil extensions 12d and 12e facing the radially inner side faces of the upper coil extensions 13d and 13e. Although only one recess 12f is shown in FIG. 6 as being formed on the radially outer side face of the lower coil extension 12d, the similar recess 12f is formed also on the radially outer side face of the lower coil extension 12e.

Figure 7:
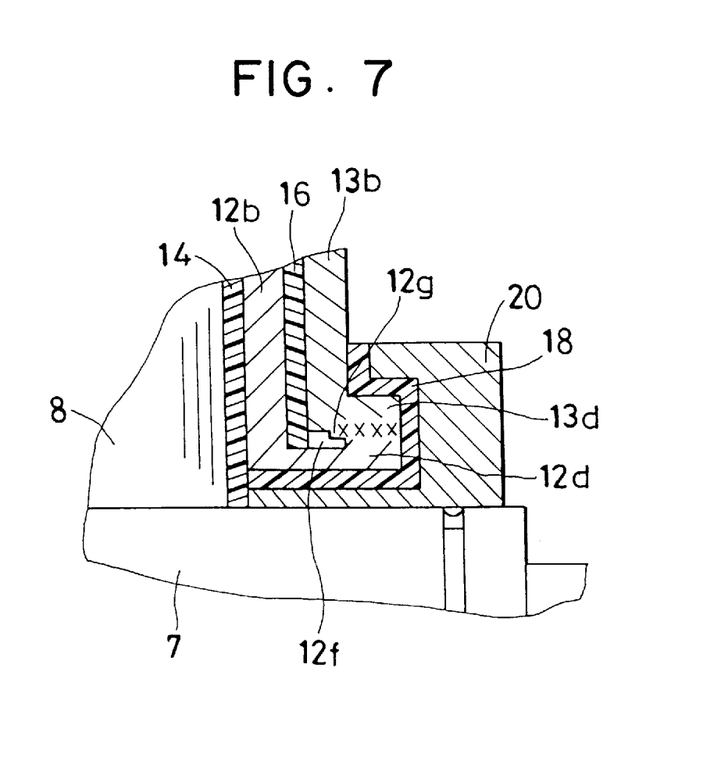
FIG. 7 is an enlarged cross sectional view showing a joined part between the lower coil conductor and the upper coil conductor in the second embodiment.

According to this embodiment, as the axial contact length of the faces of the lower coil extensions 12d and 12e and the upper coil extensions 13d and 13e to be joined together can be shortened, the joined part having no imperfect joint can be provided as shown in FIG. 7 as in the first embodiment. As the excess volume 12g produced at the time of welding is enabled to flow into the space provided by the recess 12f, the joined parts located adjacently in the circumferential direction do not contact each other thus assuring electric insulation between the joined parts.

(Third Embodiment)

Figure 8:
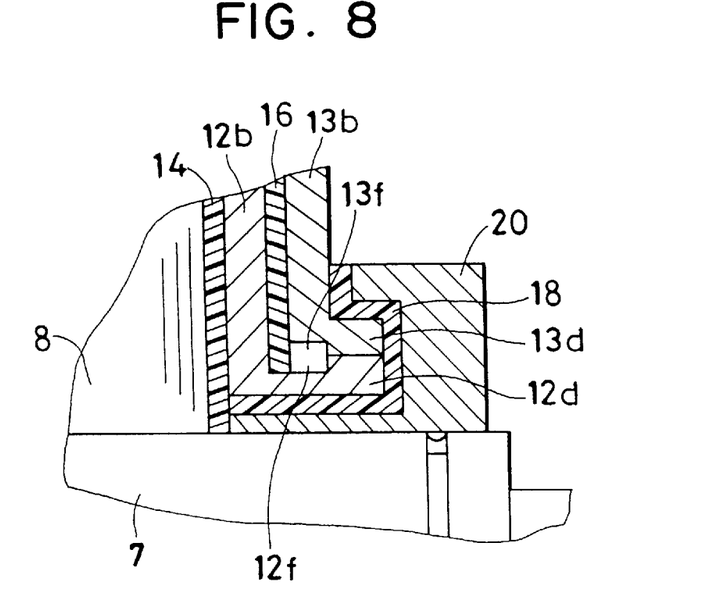
FIG. 8 is an enlarged cross sectional view showing parts of a lower coil conductor and an upper coil conductor to be joined in the third embodiment.

In this embodiment, as shown in FIG. 8, the recesses 13f and 12f are formed on both of the radially inner side faces of the upper coil extensions 13d and 13e and the radially outer side faces of the lower coil extensions 12d and 12e. Although only recesses 13f and 12f are shown in FIG. 8 as being formed on the radially inner side face of the upper coil extension 13d and the radially outer side face of the lower coil extension 12d, the similar recesses 13f and 12f are formed also on the radially inner side face of the upper coil extension 13e and the radially outer side face of the lower coil extension 12e. The recess 13f is formed by the protrusion 25a on the lower die 25 as in the first embodiment, while the recess 12f is formed by a protrusion (not shown) on an upper die (not shown) used for forming the lower coil extension 12d.

Figure 9:
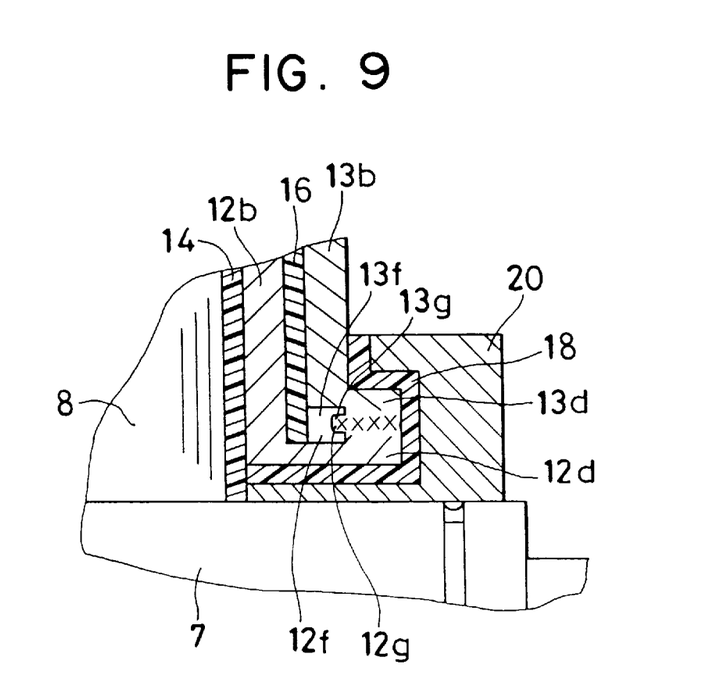
FIG. 9 is an enlarged cross sectional view showing a joined part between the lower coil conductor and the upper coil conductor in the third embodiment.

According to this embodiment also, as the axial contact length of the faces of the lower coil extensions 12d and 12e and the upper coil extensions 13d and 13e to be joined together can be shortened, the joined part having no imperfect joint can be provided as shown in FIG. 9. As the excess volume 13g and 12g produced at the time of welding are enabled to flow into the space provided by the recesses 13f and 12f, the joined parts located adjacently in the circumferential direction do not contact each other thus assuring electric insulation between the joined parts.

(Fourth Embodiment)

Figure 10:
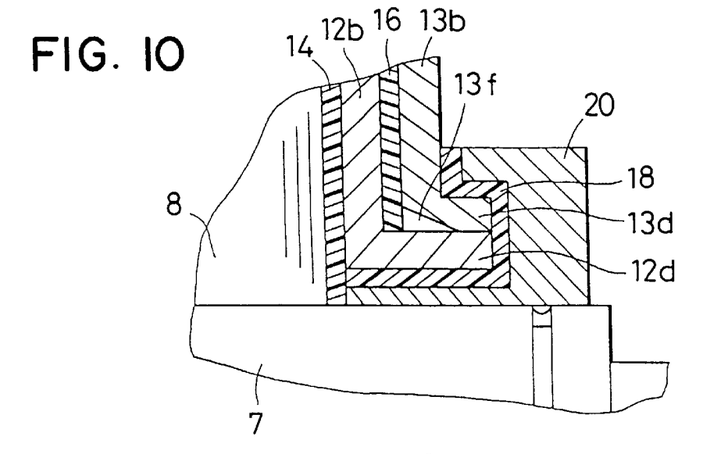
FIG. 10 is an enlarged cross sectional view showing parts of a lower coil conductor and an upper coil conductor to be joined in the fourth embodiment.
Figure 11:
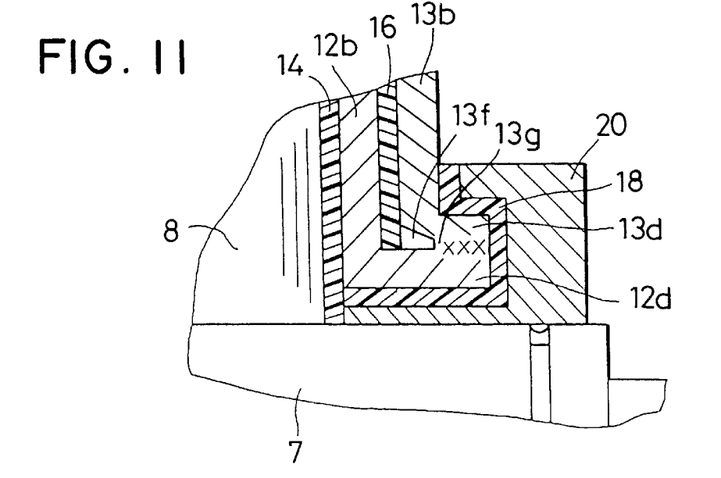
FIG. 11 is an enlarged cross sectional view showing a joined part between the lower coil conductor and the upper coil conductor in the fourth embodiment.

In this embodiment, as shown in FIG. 10, the recess 13f is taperd on the radially inner side face of the upper coil extensions 13d and 13e. Although only one recess 13f is shown in FIG. 10 as being formed on the radially inner side face of the upper coil extension 13d, the similar recess 13f is formed also on the radially inner side face of the upper coil extension 13e. According to this embodiment also, the same advantage as in the above embodiments can be provided, that is, the joined part having no imperfect joint can be provided as shown in FIG. 11.

Further, as the excess volume 13g produced at the time of welding is enabled to flow into the space provided by the recess 13f, a gap is assured between the joined parts located adjacently in the circumferential direction thus assuring electric insulation between the joined parts.

Figure 12:
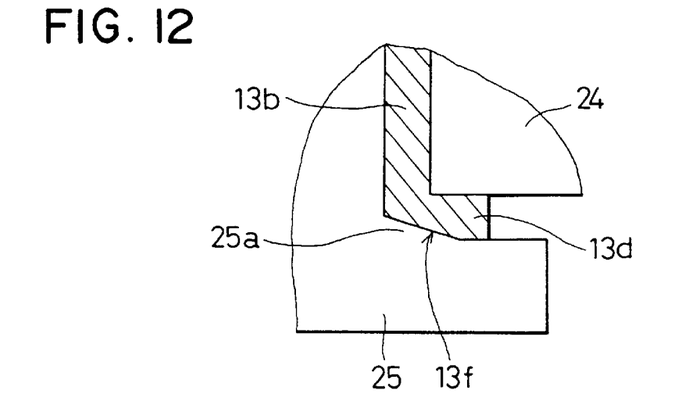
FIG. 12 is an enlarged cross sectional view showing a process for forming a tapered recess on the upper coil extension in the fourth embodiment.

It is an additional advantage specific to this embodiment that the recess 13f can be formed with ease. That is, as the recess 13f in this embodiment does not have a step change in shape against the radially inner side faces of the upper coil extensions 13d and 13e, it can be formed with ease accordingly. Although the recess 13f can be formed concurrently by the protrusion 25a formed on the lower die 25 when the upper coil extensions 13d and 13e are formed by the upper die 24 and the lower die 25 as shown in FIG. 12 in the same manner as in the first embodiment, the lower die 25 can be produced in low cost and its durability can be lengthened because the protrusion 25a need not be protruded excessively.

(Fifth Embodiment)

Figure 13:
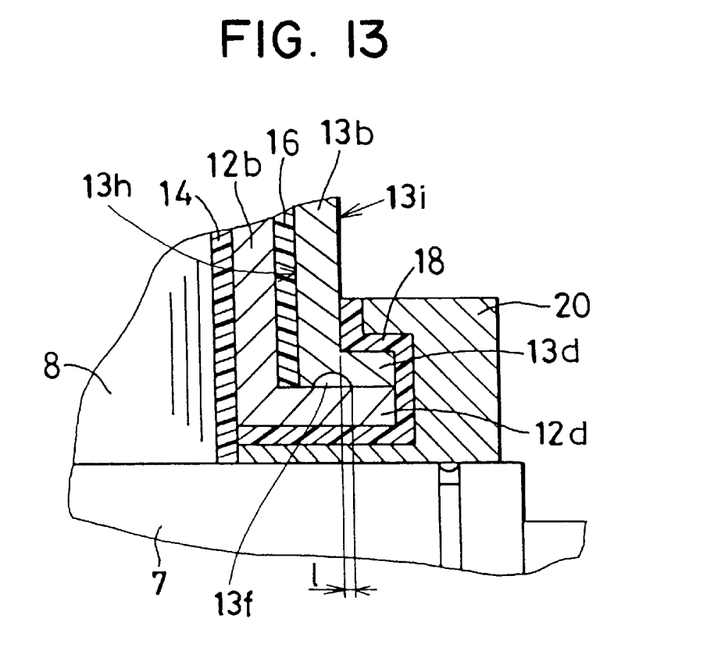
FIG. 13 is an enlarged cross sectional view showing parts of a lower coil conductor and an upper coil conductor to be joined in the fifth embodiment.

In this embodiment, as shown in FIG. 13, the recess 13f is formed on the radially inner side faces of the upper coil extensions 13d and 13e. The recess 13f is formed at a location which is axially away from the axially inner side face 13h of the upper coil arms 13b and 13c facing the armature core 8. Although only one recess 13f is shown in FIG. 13 as being formed on the radially inner side face of the upper coil extension 13d, the similar recess 13f is formed also on the radially inner side face of the upper coil extension 13e. According to this embodiment also, the same advantage as in the above embodiments can be provided, that is, the joined part having no imperfect joint can be provided as shown in FIG. 14.

Further, as shown in FIG. 13, the recess 13f has one end at a position axially outside of the axially outer side face 13i of the upper coil arm 13b. The recess 13f has a distance from the axial position of the side face 13i of the upper coil arms 13b and 13c to its end. That is, the recess 13f is formed to extend across the axial position of the side face 13i of the upper coil arms 13b and 13c which is opposite to the armature core 8. As this arrangement reduces a heat transfer area between the upper coil extensions 13d and 13e and the upper coil arms 13b and 13c, the heat is less likely to be transferred from the upper coil extensions 13d and 13e to the upper coil arms 13b and 13c. As a result, the upper coil extensions 13d and 13e and the lower coil extensions 12d and 12e can be joined more assuredly.

Figure 14:
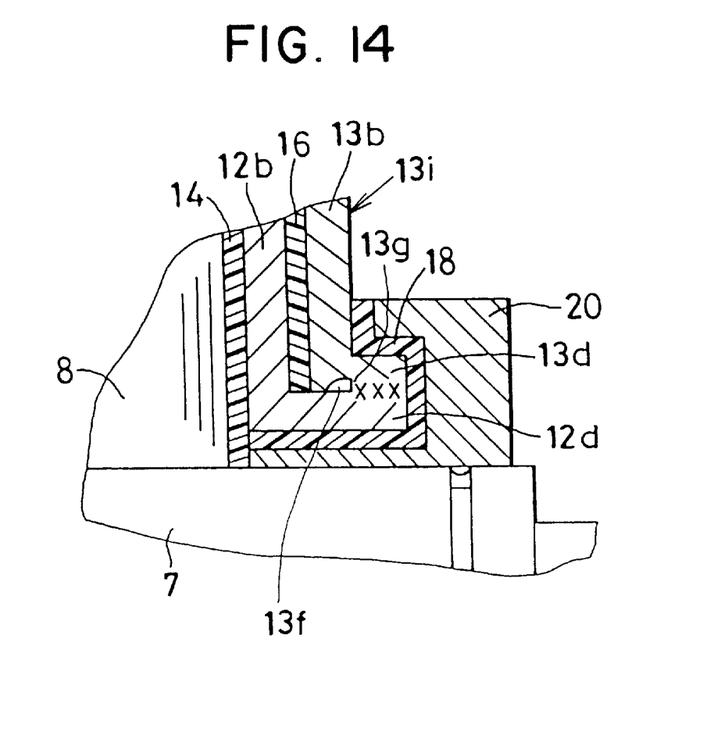
FIG. 14 is an enlarged cross sectional view showing a joined part between the lower coil conductor and the upper coil conductor in the fifth embodiment.

As the excess volume 13g produced by the heating and melting at the time of welding is enabled to flow into the recess 13f as shown in FIG. 14, the excess volume 13g does not flow out circumferentially from the joined part thus assuring electric insulation between the joined parts circumferentially adjacent to each other. Further, as the excess volume 13g flows into the recess 13f, the spot on which stress concentrates does not become acute. Therefore, as the stress does not concentrate on one spot, the durability is improved.

In this embodiment, the recess may be provided on the radially outer side faces of the lower coil extensions 12d and 12e.

The present invention should not be limited to the above embodiments, but may be implemented in other ways without departing from the spirit of the invention.

We claim:

1. An armature for a rotary electric machine comprising:
   an armature core
      having slots extending axially;
   lower coil conductors each including a lower coil trunk accommodated in one of the slots, a pair of lower coil arms extending radially inwardly from both axial ends of the lower coil trunk in parallel with axial side end faces of the armature core respectively, and a pair of lower coil extensions extending axially outwardly from radially innermost ends of the lower coil arms respectively; and
   upper coil conductors each including an upper coil trunk accommodated radially outside of the lower coil trunk in another of the slots, a pair of upper coil arms extending radially inwardly from both axial ends of the upper coil trunk in parallel with the axial side end faces of the armature core and along axially outer side faces of the lower coil arms respectively, and a pair of upper coil extensions extending axially outwardly from radially innermost ends of the upper coil arms and along radially outer side faces of the lower coil extensions respectively;
   the lower coil extensions of the lower coil conductor in the one slot and the upper coil extensions of the upper layer conductor in the another slot being electrically joined to each other by heating and melting,
   wherein at least one of radially outer side faces of the lower coil extensions and radially inner side faces of the upper coil extensions radially facing each other has recesses at positions which are axially inside of axially outermost end faces thereof, wherein said recesses provide a non-contact part between the lower coil extension and the upper coil extension.

2. The armature of claim 1, wherein:
   the recesses are provided axially outside of an axially inner side faces of the upper coil arms.

3. The armature of claim 2, wherein:
   the recesses are provided on the radially inner side faces of the upper coil extensions and extends across an axial position of axially outer side faces of the upper coil arms.

4. The armature of claim 1, wherein:
   the upper coil conductors provide a brush sliding face by the upper coil arms disposed at one of axial side ends of the armature core.

5. A production method for the armature of claim 1, the method comprising the steps of:

providing an upper die and a lower die for forming the upper coil extensions;

providing protrusions on one of the upper die and the lower die which forms the radially inner side faces of the upper coil extensions for forming the recesses; and moving relatively the upper die and the lower die to form the recesses concurrently with forming the upper coil extensions.

6. An armature for a rotary electric machine comprising:

an armature core having an axial end side face;

a lower coil conductor assembled to the armature core and having a lower coil arm extending radially inwardly along the axial end side face of the armature core and a lower coil extension extending axially from a radial end of the lower coil arm; and an upper coil conductor assembled to the armature core and having an upper coil arm extending radially inwardly along an axially outer side face of the lower coil arm and an upper coil extension extending axially from a radial end of the upper coil arm along a radially outer side face of the lower coil extension, the lower coil extension and the upper coil extension being welded to contact each other to provide a part of an armature coil, wherein at least one of the lower coil extension and the upper coil extension has a recess to provide a non-contact part between the lower coil extension and the upper coil extension.

7. The armature of claim 6, wherein:

the recess is provided on the upper coil extension near a position where an axially inner side face thereof and radially inner side face thereof cross.

8. The armature of claim 7, wherein:

the recess is tapered.

9. The armature of claim 7, wherein:

the recess is provided to extend across an axial position of an axially outer side face of the upper coil arm.

10. A production method for the armature of claim 6, the method comprising the steps of:

providing an upper die and a lower die for forming one of the the lower coil conductor and the upper coil conductor;

providing a protrusion on one of the upper die and the lower die at a position where the recess is to be formed;

moving relatively the upper die and the lower die to form the recess concurrently with forming the one of the lower coil conductor and the upper coil conductor; and welding the lower coil extension and the upper coil extension at a position axially outside the recess.

* * * * *